United States Patent
Marck et al.

(10) Patent No.: US 6,386,024 B1
(45) Date of Patent: May 14, 2002

(54) APPARATUS FOR MONITORING TREAD THICKNESS DURING TIRE BUFFING

(75) Inventors: Nicholas P. Marck, Moore; Fred G. Mayntz, Greer; Robert G. Young, Mauldin, all of SC (US)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/407,179

(22) Filed: Sep. 29, 1999

(51) Int. Cl.⁷ .............................................. B21C 47/00
(52) U.S. Cl. ...................................................... 73/146
(58) Field of Search ..................... 73/146, 146.2–146.5, 73/146.8; 157/13

(56) References Cited

U.S. PATENT DOCUMENTS

| | | | | |
|---|---|---|---|---|
| 4,147,196 A | * | 4/1979 | Jarry | 157/13 |
| 4,372,366 A | * | 2/1983 | Dugger | 157/13 |
| 5,216,372 A | * | 6/1993 | Zoughi et al. | 73/146 |
| 5,238,041 A | * | 8/1993 | Tomita et al. | 157/13 |
| 5,307,854 A | * | 5/1994 | Brewer | 157/13 |

OTHER PUBLICATIONS

Patent Abstract of Japan, Publication No.: 58001546, Publication Date: Jun. 1, 1983.

* cited by examiner

Primary Examiner—Benjamin R. Fuller
Assistant Examiner—Maurice Stevens
(74) Attorney, Agent, or Firm—Martin Farrell; Alan A. Csontos; Robert R. Reed

(57) ABSTRACT

An apparatus for monitoring the depth of tread on a tire being buffed includes a sensing device, for example, a magnetic sensor, mounted to a reciprocating motion carrier. The carrier is driven by a drive wheel that is in contact with the tire being buffed. The carrier is movably mounted to float over the surface of the tire, that is, accommodate variations in the tire surface, with a guide wheel following the tire surface to maintain the sensor at a constant distance from the tire surface. The sensor on the carrier reciprocally traverses the crown of the tire as the tire rotates to obtain actual values for the thickness of the rubber above the belts over the whole surface of the crown.

12 Claims, 2 Drawing Sheets

APPARATUS FOR MONITORING TREAD THICKNESS DURING TIRE BUFFING

BACKGROUND AND SUMMARY

To prepare a tire for retread the tire is buffed, an operation in which rasps strip the worn tread from the crown as the tire rotates on a fixture. A rubber layer of a desired thickness is left on the crown to maintain the integrity of the carcass plies and belts and provide a surface on to which to bond the new tread. The rasps provide an evenly contoured surface usually having a radius that peaks at the center of the tread.

The buffer rasps must avoid exposing or cutting into the underlying steel belts, which can damage the belts and destroy the integrity of the carcass, rendering the tire unfit for further use.

A retread facility will typically handle tires from a variety of manufacturers, which presents to the buffer different tire structures with different tread thicknesses and different belt constructions, shapes and locations. In addition, tires requiring retread are generally not worn to a standard condition. Further, an individual tire is not likely to have a uniform pattern of wear over the tread surface. Thus, the buffer and the buffer operator are required to determine essentially on a tire-by-tire basis the amount of rubber to remove from each tire.

Automated buffing machines typically rely on a sensor to measure the depth of tread rubber between the outer surface and the steel belts. The rasps, which remove rubber from the tire, are controlled based on a signal generated by the sensor. In conventional buffing machines, the sensor is fixed at the equator of the tire, that is, the central plane perpendicular to the rotation axis. This arrangement provides depth information that is accurate for the central plane, but not necessarily for the lateral regions of the tread.

The lack of information at the lateral or shoulder regions creates difficulties for buffing those areas. Steel belts in a tire are not always at the same depth across the tire tread. In addition, variations within manufacturing tolerance can produce tires with slight differences in belt location, particularly at the belt edges. Moreover, the belts may not follow the contour that the buffer will apply to the carcass crown.

A buffer relying on a centrally-located sensor, therefore, may sense sufficient rubber thickness at the center while the rasps cut into the steel belts at the shoulder of the tire, thus destroying the tire.

The present invention provides a solution to this problem with an apparatus for a tread depth monitoring that measures the rubber thickness across the width of the tire.

According to the invention, a tread depth sensor is carried on a mechanism that traverses the width of the tire in a reciprocating manner while the tire rotates to sense rubber depth across the width of the crown. Using depth information for the full width of the tire, a buffer can be controlled to stop with a minimum thickness of rubber for the entire surface.

A device in accordance with the invention includes a drive wheel that engages the tire tread surface and is driven by rotation of the tire. Drive wheel power is transmitted to a reciprocating motion device that transforms the rotation movement into linear reciprocating movement. A sensor is mounted to the reciprocating motion device to be carried transversely across the tire tread in reciprocating movements.

According to another aspect of the invention, a guide wheel attached to the sensor contacts the crown surface and follows the surface to guide the carrier movements on the crown. The guide wheel establishes a reference location for the sensor relative to the crown surface.

According to yet another aspect of the invention, the sensor and guide wheel are mounted to the reciprocating motion device for free movements normal, or perpendicular, to the tire crown surface to accommodate variations in the surface. Preferably, a vertical slide is used to mount the sensor and guide wheel for movements relative to the reciprocating motion device. As the guide wheel follows the crown, perpendicular movement of the guide wheel and sensor accommodate changes in the crown surface to prevent jarring or bouncing the sensor.

The tire sensor may be any suitable sensor for sensing the location of the steel belts under the crown rubber, for example, a magnetic sensor, an ultrasound sensor, a laser, or an optical device.

BRIEF DESCRIPTION OF THE DRAWINGS

The invention will be better understood by reference to the following detailed description in conjunction with the appended drawings, in which.

DETAILED DESCRIPTION

Figure 1:
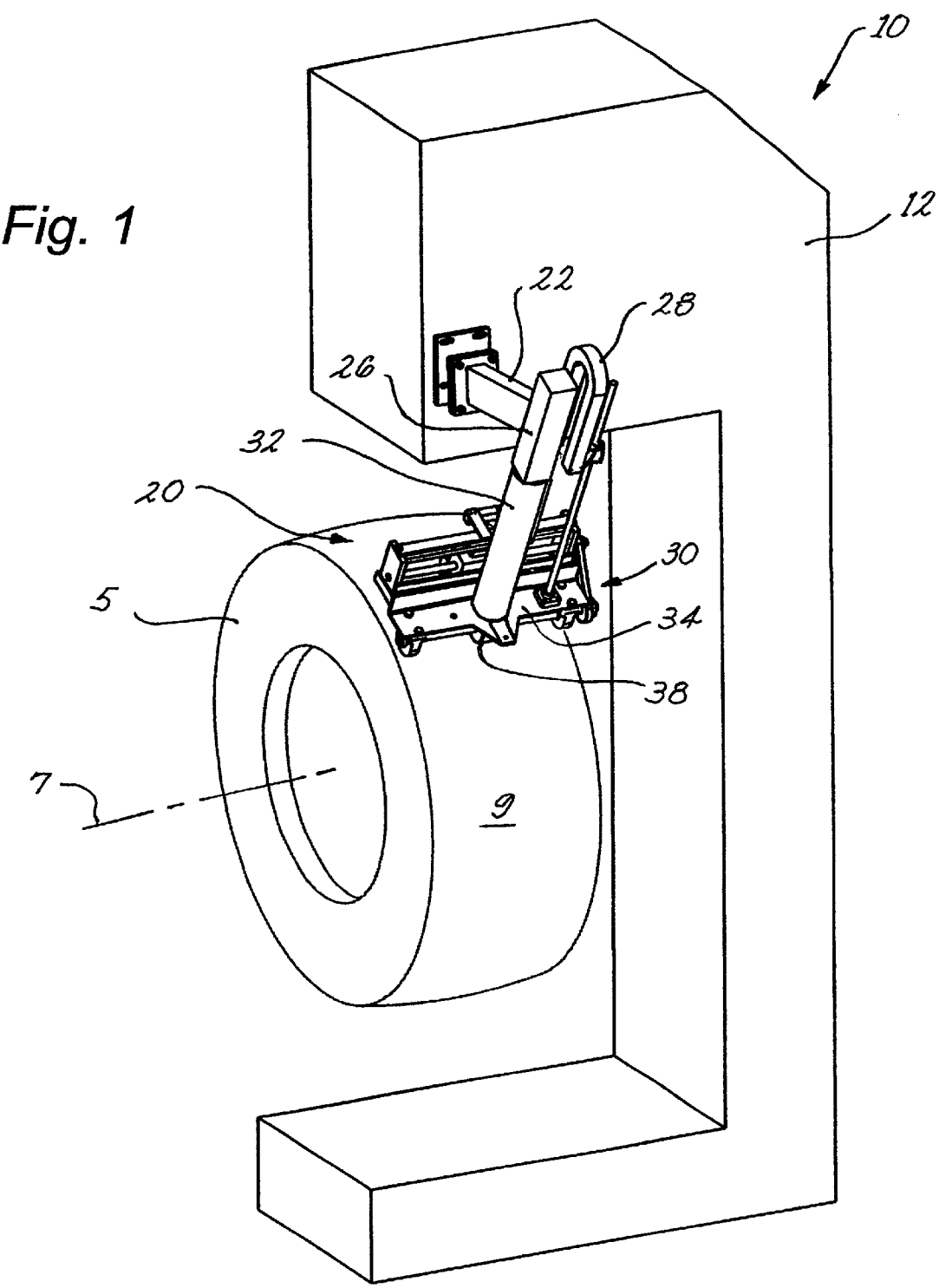
FIG. 1 is a perspective from the rear of a buffing monitoring apparatus in accordance with the invention.

FIG. 1 illustrates in perspective view a buffing monitoring apparatus 20 in accordance with the invention. The apparatus 20 is shown in a rear view mounted to a buffing machine or buffer 10. The buffer 10 is shown in highly simplified form as the details of the buffer do not form part of the present invention.

As will be understood by those skilled in the art, the buffer 10 includes a base 12 that supports a motor and components (not illustrated) to rotate a tire 5 on its axis 7. A rasp assembly (also not illustrated) is mounted to the base 12 and is movable relative to the tire crown 9 to remove worn tread and form a contoured surface to which to bond the new tread.

The buffing monitoring apparatus 20 in accordance with the invention includes a mounting frame including supporting arm 22 mounting the apparatus to the buffer 10. A carriage 30 is mounted to the supporting arm 22 by a post 32. The post 32 is slidably mounted in a sleeve 26 on the supporting arm 22 to allow the carriage 30 move relative to the crown to accommodate variations in height in the crown surface 9. A flexible wiring housing 28 protects electrical wiring from damage during movements.

A position sensor may be installed to sense the position of the post 32 relative to the sleeve 26. Any suitable position sensing device can be used, including switches, LED devices, a magnetic device, or others, as will be understood by those skilled in the art.

Figure 2:
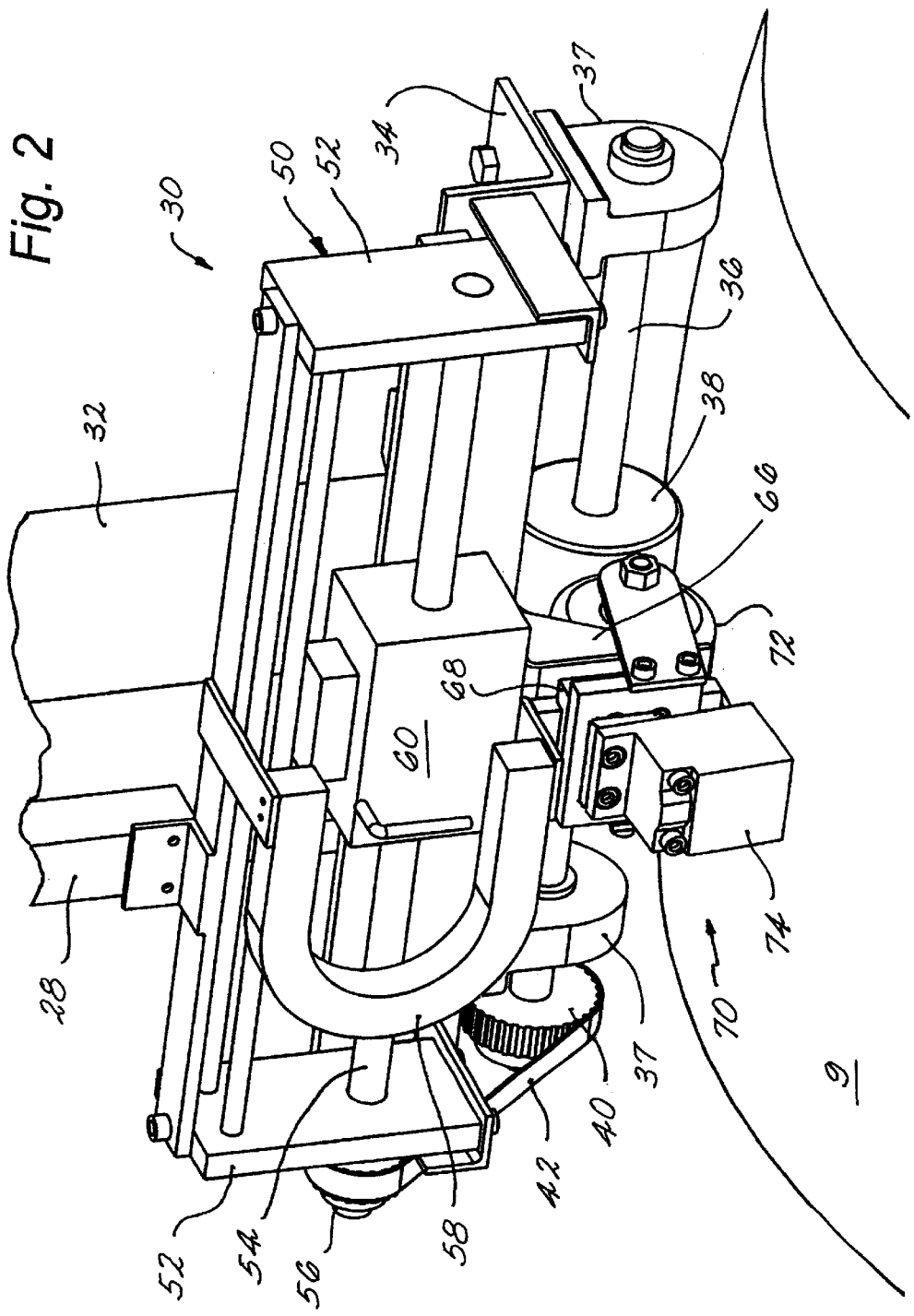
FIG. 2 is an enlarged perspective view from the front of the apparatus of FIG. 1.

Turning to FIG. 2, an enlarged perspective view of the carriage 30 is illustrated from a direction opposite that of FIG. 1. The carriage 30 includes a bracket 34 attached to the end of the post 32 and oriented parallel to the crown. The bracket 34 supports an axle 36 and a drive wheel 38. The axle 36 is supported for rotation at opposite ends by bearings 37. The drive wheel 38 is carried between the bearings 37 to contact the crown surface 9 of the tire mounted on the buffer. Rotation of the tire by the buffer turns the drive wheel 38 and axle 36, which provides power to the apparatus, as explained below.

A reciprocal motion device 50 is attached to the bracket 34. According to a preferred embodiment, a mechanical reciprocal motion device is used, for example, a Uhing Rolling Ring Drive No. RG3-15-2 MCRF, manufactured by Joakim Uhing KG, GmbH & Co. of Mielkendorf, Germany and available from Amacoil Machinery, Inc. of Alston, Pa.

The reciprocal motion device 50 includes two plates 52 that support a shaft 54. Power is transmitted from the drive wheel axle 36 to the shaft 54 through a drive gear 40 mounted on the drive wheel axle 36 and a belt 42 engaged to a follower gear 56 mounted to the shaft 54.

A converter 60 is carried on the shaft 54 and converts rotation of the shaft 54 into linear reciprocating movement on the shaft. The shaft 54 is disposed substantially parallel to the rotation axis 7 of the tire, so that the generated reciprocal movements are directed along the transverse direction of the crown 9. The distance the converter 60 moves along the shaft 54 may be set to correspond to the tread width of a particular tire. In addition, the speed of linear movement of the device may also be set. The converter 60 is mechanical, which advantageously requires no additional drive motors or electrical power.

The reciprocal motion device just described is presently preferred because it is mechanically powered and operated, and may be easily installed on a buffing machine. Those skilled in the art will recognize that other device capable of converting rotating motion into linear, reciprocating motion could be substituted in the apparatus in accordance with the invention. For example, a servo motor using limit switches or position sensors to control changes of direction, could be used. Alternatively, an reversible electric motor could drive a worm gear shaft to generate the reciprocating movements.

A linear position sensor (not illustrated) could be mounted in proximity to the converter 60 to obtain the transverse position of the converter. The linear position sensor could be any device such as those described for the vertical position sensor, above.

A mounting bracket 66 is carried on the converter 60 and extends below toward the crown 9. The mounting bracket 66 includes a sliding coupling 68 that supports a sensor assembly 70 for movement normal, or perpendicular, to the crown surface 9.

The sensor assembly 70 includes a guide wheel 72 and a sensor 74 mounted together on a plate coupled to the sliding coupling 68. The guide wheel 72 is positioned for contact with the crown, and establishes and maintains a constant distance for the sensor relative to the crown surface 9. Small variations in the surface 9 are accommodated by the sliding coupling 68, which permits the sensor assembly 70 to move relative to the mounting bracket 66 in relation to the crown surface 9 contour. By allowing movement of the sensor assembly, which rides on the crown surface 9, bouncing and other abrupt movements are avoided, and the quality of the measurements is improved.

A flexible wire housing 58 carries wiring for the sensor from the carrier 30 to the sensor 74 to prevent damage as the sensor moves.

As mentioned above, larger variations in the surface 9 are accommodated by movements of the post 32 in the sleeve 26 sliding mount.

Vertical distance information and transverse position information may be provided to the buffer's controller.

The sliding coupling 68 is conveniently a linear slide mechanism. Other devices that permit movement of the sensor assembly to accommodate the crown contour are also acceptable, for example, a pivoting arrangement or a post and sleeve arrangement.

The sensor 74 is directed toward the crown surface 9 to determine the location of the belt relative to the crown surface, which is proportional to the thickness of rubber above the steel belts of the tire. The sensor 74 may be a magnetic sensor, an ultrasound sensor, a laser, an optical device, or any other device that can sense the location of the belts and provide a proportional signal. By moving reciprocally over the surface of the crown 9 and measuring the rubber thickness from shoulder to shoulder, the sensor provides actual information to the buff controller about the amount of rubber above the belts for the entire crown. According to a simple control scheme, the buff controller can be programmed to stop buffing when the sensor measures a particular thickness value (representing a desired minimum thickness) at any location of the crown. Exposing or cutting into the belts is thus avoided.

A more complex control system is also possible. Both thickness and location information can be transmitted to the buff controller for more precise control during contouring of the crown, for example, to provide a uniform rubber thickness over the whole crown.

The invention has been described in terms of preferred principles, components, and structure; however, those skilled in the art will recognize that substitutions for the described and illustrated components and structure may be made without departing from the spirit of the invention which is defined in the appended claims.

What is claimed is:

1. An apparatus for monitoring a tire crown while buffing a tire on a buffing machine, comprising:

a frame mountable to the buffing machine;

a drive wheel mounted to the frame for contact with a crown surface of a rotating tire;

a reciprocal motion device mounted to the frame and driven by the drive wheel that provides reciprocal motion transverse to the tire crown; and a sensing device carried by the reciprocal motion device for sensing the location of a belt in the tire relative to the crown surface.

2. The apparatus as claimed in claim 1, wherein the sensing device is mounted for movement normal to the crown, and further comprising a guide wheel mounted to the sensing device for contacting and following the crown of the tire to maintain the sensing device at a substantially constant distance from the crown surface.

3. The apparatus as claimed in claim 2, wherein the sensing device is pivotally mounted to the reciprocal motion device.

4. The apparatus as claimed in claim 2, wherein the sensing device is mounted to a slidable coupling on the reciprocal motion device.

5. The apparatus as claimed in claim 1, wherein the sensing device includes magnetic based sensing.

6. The apparatus as claimed in claim 1, wherein the sensing device includes ultrasound sensing.

7. The apparatus as claimed in claim 1, wherein the sensing device includes laser sensing.

8. The apparatus as claimed in claim 1, further comprising means for setting the transverse movement extent of the reciprocal motion device.

9. The apparatus as claimed in claim 1, further comprising means for controlling a speed of transverse movement of the reciprocal motion device.

10. The apparatus as claimed in claim 1, further comprising means for sensing a location of the sensor relative to the crown transverse direction.

11. The apparatus as claimed in claim 1, further comprising a post slidably mounted to the frame for movements normal to the tire crown, wherein the drive wheel and reciprocal motion device are mounted to the post.

12. The apparatus as claimed in claim 1, further comprising means for transmitting to a buffing controller a signal produced by the sensing device responsive to a sensed location of the belt.

* * * * *